(12) United States Patent
Nakagawa

(10) Patent No.: US 10,002,463 B2
(45) Date of Patent: Jun. 19, 2018

(54) INFORMATION PROCESSING APPARATUS, INFORMATION PROCESSING METHOD, AND STORAGE MEDIUM, FOR ENABLING ACCURATE DETECTION OF A COLOR

(71) Applicant: CANON KABUSHIKI KAISHA, Tokyo (JP)

(72) Inventor: Masashi Nakagawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days. days.

(21) Appl. No.: 15/150,236

(22) Filed: May 9, 2016

(65) Prior Publication Data
US 2016/0350975 A1    Dec. 1, 2016

(30) Foreign Application Priority Data

May 25, 2015 (JP) .................................. 2015-105599

(51) Int. Cl.
*G06T 19/00* (2011.01)
*G06T 11/00* (2006.01)
(Continued)

(52) U.S. Cl.
CPC .............. *G06T 19/006* (2013.01); *G06F 3/00* (2013.01); *G06T 7/337* (2017.01); *G06T 11/001* (2013.01);
(Continued)

(58) Field of Classification Search
CPC ......... G06F 3/00; G06T 7/337; G06T 11/001; G06T 19/006; G06T 7/0044; G06T 7/003;
(Continued)

(56) References Cited

U.S. PATENT DOCUMENTS

2006/0055784 A1* 3/2006 Sugihara ................ H04N 9/735
348/207.99
2007/0031032 A1* 2/2007 Oh ..................... G06K 9/00234
382/167
(Continued)

FOREIGN PATENT DOCUMENTS

JP         2007-052609 A      3/2007
WO     WO2014024364      *  2/2014

OTHER PUBLICATIONS

Hoiem, Epipolar Geometry and Stereo Vision, Apr. 2011, URL: https://courses.engr.illinois.edu/cs543/sp2011/lectures/Lecture%2023%20-%20Epipolar%20Geometry%20and%20Stereo%20-%20Vision_Spring2011.pdf, pp. 59.*

*Primary Examiner* — Mark K Zimmerman
*Assistant Examiner* — Phuc N Doan
(74) *Attorney, Agent, or Firm* — Canon U.S.A., Inc. IP Division

(57) ABSTRACT

In order that color information for enabling accurate detection of a specific color, such as a skin color, can be registered without requiring time and effort, in various embodiments, an image processing unit generates a synthesized image to be displayed by synthesizing an image representing a target area in which a target object is arranged with a captured image of a physical space, and a registration unit, in a case where it is determined that the target object is included in a distance range set as a distance from an imaging reference plane when the physical space is captured, extracts color information from the target area, and registers the extracted color information.

15 Claims, 9 Drawing Sheets

(51) Int. Cl.
*G06F 3/00* (2006.01)
*G06T 7/33* (2017.01)

(52) U.S. Cl.
CPC ............... *G06T 2207/10016* (2013.01); *G06T 2207/10024* (2013.01); *G06T 2207/30196* (2013.01)

(58) Field of Classification Search
CPC . G06T 2207/10016; G06T 2207/10024; G06T 2207/10028; G06T 2207/30196; G06T 2207/30244
See application file for complete search history.

(56) References Cited

U.S. PATENT DOCUMENTS

| | | | | |
|---|---|---|---|---|
| 2007/0058860 | A1* | 3/2007 | Harville | G06K 9/00234 382/167 |
| 2010/0329511 | A1* | 12/2010 | Yoon | G06K 9/00382 382/103 |
| 2013/0120610 | A1* | 5/2013 | Tsubaki | H04N 5/235 348/229.1 |
| 2014/0372957 | A1* | 12/2014 | Keane | G06F 3/013 715/852 |
| 2015/0131112 | A1* | 5/2015 | Mori | H04N 1/60 358/1.9 |
| 2015/0332471 | A1* | 11/2015 | Heo | G06T 7/11 382/103 |
| 2015/0356785 | A1* | 12/2015 | Takemoto | G06T 7/11 345/633 |
| 2016/0021353 | A1* | 1/2016 | Lundberg | H04N 13/0239 348/54 |

* cited by examiner

INFORMATION PROCESSING APPARATUS, INFORMATION PROCESSING METHOD, AND STORAGE MEDIUM, FOR ENABLING ACCURATE DETECTION OF A COLOR

BACKGROUND OF THE INVENTION

Field of the Invention

The present invention relates to an information processing apparatus, an information processing method, and a program.

Description of the Related Art

Japanese Patent Application Laid-Open No. 2007-52609 describes a hand area detection device for detecting, for example, an image area (a hand area) corresponding to a part of human hand from an input image. The hand area detection device described in Japanese Patent Application Laid-Open No. 2007-52609 first extracts a hand candidate area from an input image using a skin color model based on statistical human skin color features. Next, the hand area detection device calculates complexity of shape of the extracted hand candidate area. Subsequently, the hand area detection device determines whether the hand candidate area is a hand area based on the calculated complexity of shape.

According to the technique described in the above Japanese Patent Application Laid-Open No. 2007-52609, whether the hand area can be accurately detected or not depends on what kind of model is the skin color model based on statistical human skin color features. However, in order to generate the skin color model for enabling accurate determination of whether an input image includes skin color, for example, it is necessary to obtain and register in advance an enormous number of the skin color information pieces in consideration of various environments and the like. However, an immense amount of time and effort is required to register in advance such an enormous number of the skin color information pieces.

SUMMARY OF THE INVENTION

An information processing apparatus according to the present application includes a generation unit configured to generate a synthesized image to be displayed by synthesizing an image representing a target area in which a target object is arranged with a captured image of a physical space, and a registration unit configured to determine whether the target object in the target area in the synthesized image is included in a distance range set as a distance from an imaging reference plane when the physical space is captured, in a case where it is determined that the target object is included in the distance range, to extract color information from the target area, and to register the extracted color information as specific color information.

According to the present application, color information for enabling accurate detection of a specific color such as a skin color can be registered without requiring time and effort.

Further features of the present invention will become apparent from the following description of exemplary embodiments with reference to the attached drawings.

DESCRIPTION OF THE EMBODIMENTS

Figure 1:
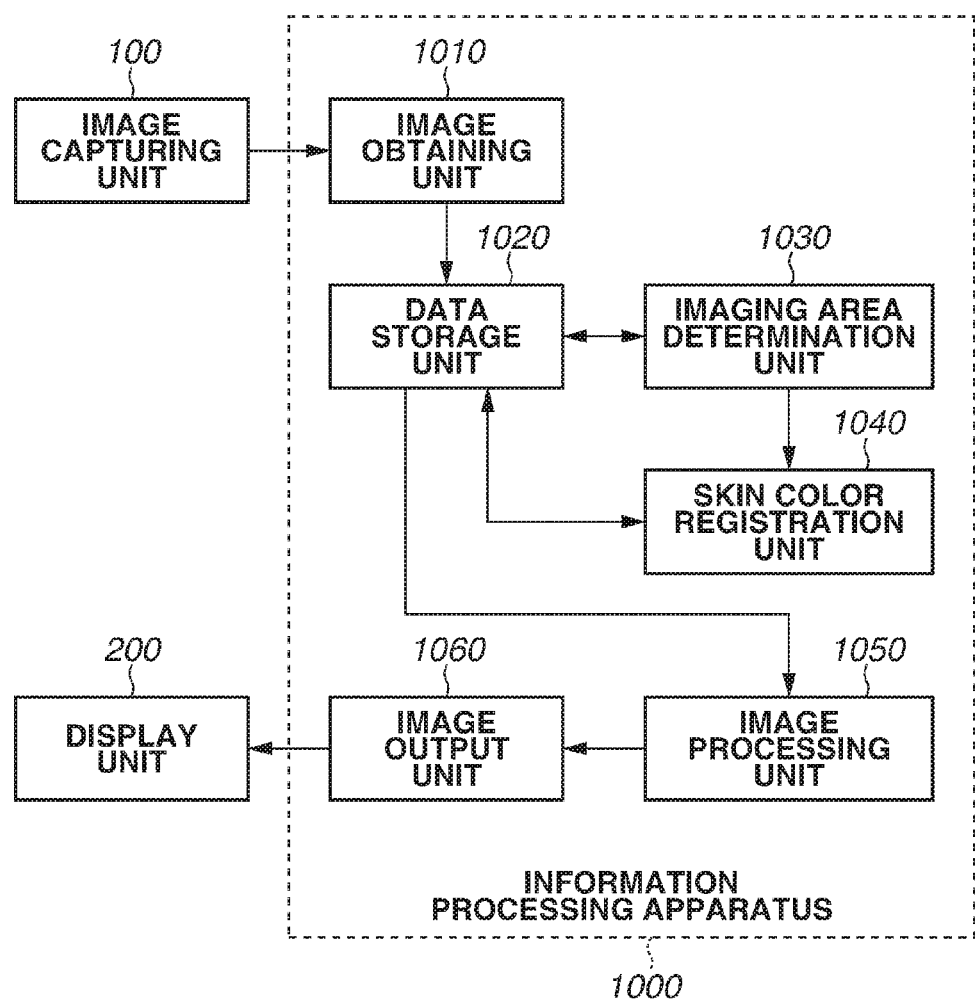
FIG. 1 illustrates an example of a configuration of an information processing apparatus according to a first exemplary embodiment.

FIG. 1 illustrates a schematic configuration of an information processing apparatus 1000 according to a first exemplary embodiment. The information processing apparatus 1000 according to the first exemplary embodiment is connected to an image capturing unit 100 and a display unit 200. The image capturing unit 100 and the display unit 200 are mounted on, for example, a head mounted display (hereinbelow, referred to as an HMD) and the like worn by a user on his/her head. The information processing apparatus 1000 may be included in, for example, the HMD or separated from the HMD. When the information processing apparatus 1000 is separated from the HMD, the HMD and the information processing apparatus 1000 are connected with each other, for example, wirelessly or in a wired way. Further, when the information processing apparatus 1000 is separated from the HMD, the information processing apparatus 1000 may be, for example, a personal computer and a portable information terminal or may be provided as a dedicated apparatus.

Figure 2:
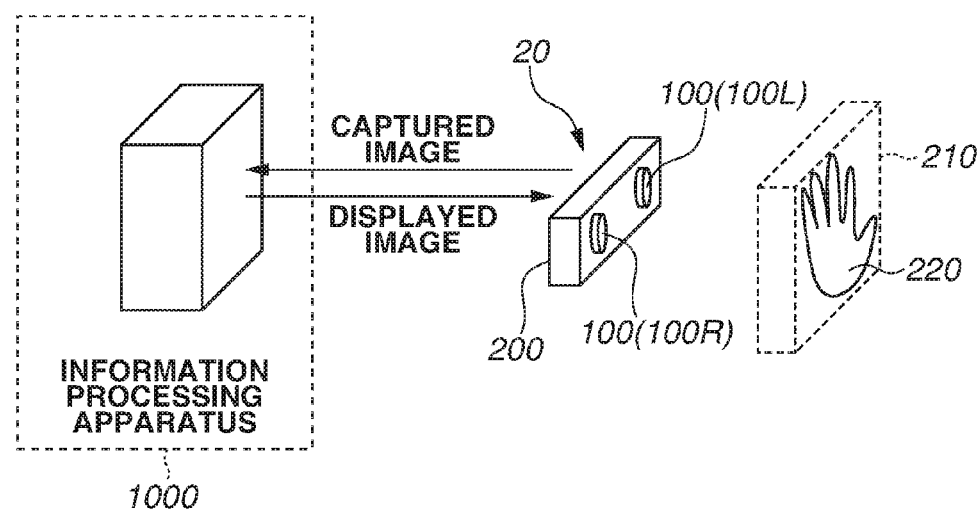
FIG. 2 illustrates an example of arrangement of an image capturing unit according to the first exemplary embodiment, an imaging area, and a hand.

FIG. 2 schematically illustrates an example of an arrangement relationship between the information processing apparatus 1000 and an HMD 20. The image capturing unit 100 mounted on the HMD 20 is a stereo camera including a right camera 100R and a left camera 100L as an example as illustrated in FIG. 2. The display unit 200 mounted on the HMD 20 is a display which includes display devices for a right eye and a left eye and can perform three-dimensional display. The display unit 200 may be a two-dimensional display. In FIG. 2, a target object (e.g., a hand 220) to be captured by the image capturing unit 100 of the HMD 20 and an imaging area 210 virtually set in a physical space are illustrated which are described below.

The information processing apparatus 1000 according to the present exemplary embodiment has a function of realizing a mixed reality (MR) for presenting to a user an actually captured image of a physical space and a virtual space image generated by computer graphics processing by superimposing on one another in real time. When the MR is realized, the information processing apparatus 1000 superimposes a whole area or a part of an actually captured image captured by the image capturing unit 100 of the HMD 20 on a virtual space image generated according to an imaging direction (bearing), an imaging orientation, and the like of the image capturing unit 100 of the HMD 20 and generates a composite image. Subsequently, the information processing apparatus 1000 displays the composite image on a screen of the display unit 200 to present the MR to a user.

As an example, when a video of a "hand" of a user captured in the actually captured image of the physical space is composited to the virtual space image, the information processing apparatus 1000 first detects an image area (hereinbelow, referred to as a hand area) corresponding to the hand from the actually captured image. More specifically, the information processing apparatus 1000 detects a pixel including a skin color component of the hand from each of pixels in a captured image in each frame constituting the actually captured image of a moving image and detects an image area in which the pixels including the skin color components congregate as a hand area. Further, the information processing apparatus 1000 detects the imaging direction (bearing) and the imaging orientation of the image capturing unit 100 of the HMD 20 at the time of imaging and also estimates a three-dimensional position of the hand in the physical space. Subsequently, the information processing apparatus 1000 extracts the hand area from the actually captured image and arranges an image of the hand area in the virtual space so that the three-dimensional position of the hand in the physical space corresponds to a three-dimensional position of the hand area in the virtual space to composite with the virtual space image. Accordingly, the MR can be realized in which the actually captured image of the hand existing in the physical space is composited and displayed in the virtual space.

When a video of the hand in the actually captured image is composited to the virtual space image, the hand area must be accurately detected from the actually captured image. As an example of a method for detecting a hand area from an actually captured image, a method can be considered which detects the hand area using a skin color model based on statistical human skin color features. However, in order to generate the skin color model based on statistical human skin color features, it is generally necessary to prepare an enormous number of the skin color information pieces, and an immense amount of time and effort is required. In addition, the skin color model based on statistical human skin color features is effective to some extent in an intended use such as detection of hand areas of various people, however, it is not always optimum for an intended use, for example, for accurately detecting a hand area of a specific user.

Therefore, the information processing apparatus 1000 according to the present exemplary embodiment can register color information for enabling accurate detection of a specific color of a specific target object, for example, a skin color of a specific user who wears the HMD 20 without requiring time and effort. A specific example is described below in which a hand 220 of a user wearing the HMD 20 as illustrated in FIG. 2 is an example of the target object and a skin color of the hand 220 is obtained and registered as specific color information. According to the present exemplary embodiment, the user's hand and the skin color information are respectively described as examples of the target object and the specific color information, however, a target object and specific color information according to the present invention are not limited to a hand and skin color information. Further, according to the present exemplary embodiment, an application example to the MR is described, however, the present invention is not limited only to application to the MR.

In the example for registering the skin color information of the hand 220, the information processing apparatus 1000 first sets a virtual three-dimensional imaging area 210 in the physical space captured by the image capturing unit 100 of the HMD 20. Further, the information processing apparatus 1000 displays a composite image superimposed with a computer graphics (hereinbelow, referred to as CG) image representing the three-dimensional imaging area 210 virtually set in the physical space on a display screen of the display unit 200 of the HMD 20. The imaging area 210 represents a three-dimensional area in which the hand 220 of the user is arranged in the actually captured image displayed on the display unit 200 of the HMD 20, namely the physical space captured by the image capturing unit 100. Further, the information processing apparatus 1000 detects an image area of the hand 220 (the hand area) captured in the imaging area 210 from an captured image of the physical space captured by the image capturing unit 100 of the HMD 20, and extracts and registers skin color information from the detected hand area. Processing by the information processing apparatus 1000 according to the present exemplary embodiment for detecting the hand area in the imaging area 210 and extracting and registering the skin color information from the hand area is described in detail below.

The information processing apparatus 1000 according to the present exemplary embodiment includes each component as illustrated in FIG. 1 as a configuration for realizing above-described setting of the imaging area 210, detection of the hand area, and extraction and registration of the skin color information. More specifically, the information processing apparatus 1000 includes an image obtaining unit 1010, a data storage unit 1020, an imaging area determination unit 1030, a skin color registration unit 1040, an image processing unit 1050, and an image output unit 1060. The image processing unit 1050 is an example of a generation unit, the imaging area determination unit 1030 is an example of a detection unit, and the skin color registration unit 1040 is an example of a registration unit. Each of the components included in the information processing apparatus 1000 may be realized by hardware or a software program. The software program may be provided and installed in the information processing apparatus 1000 via a computer readable storage medium, a network, and the like.

The image obtaining unit 1010 is an example of an imaging control unit and obtains actually captured image data of the physical space captured by the image capturing unit 100, in other words, two left and right captured image data pieces captured by the left camera 100L and the right camera 100R of the HMD 20. The image obtaining unit 1010 is constituted of, for example, a video capture card. The image obtaining unit 1010 stores the captured image data obtained from the image capturing unit 100 in the data storage unit 1020.

The data storage unit 1020 stores the captured image data of the actually captured image obtained by the image obtaining unit 1010, data of a virtual object and the like in the virtual space generated by the image processing unit 1050 executing the CG processing, the skin color information detected by the skin color registration unit 1040 described below, and the like. The data storage unit 1020 also has a function of transferring data of a captured moving image captured by the image capturing unit 100 and obtained by the image obtaining unit 1010, namely the actually captured image data of the physical space to the image processing unit 1050 almost in real time.

The image processing unit 1050 generates image data of a virtual object and the like in the virtual space generated by the CG processing. When the information processing apparatus 1000 according to the present exemplary embodiment performs processing for detecting the skin color information from the hand area and registering the information, the image processing unit 1050 generates a CG image (hereinbelow, referred to as an imaging area CG model) representing the three-dimensional imaging area 210 as illustrated in FIG. 2. The imaging area CG model is generated as a three-dimensional image with depth, and when the imaging area 210 is a three-dimensional rectangular parallelepiped model as illustrated in FIG. 2, the imaging area CG model will also be a rectangular parallelepiped three-dimensional image. The image processing unit 1050 generates a composite image by superimposing the imaging area CG model on the actually captured image data of the moving image captured by the image capturing unit 100, obtained by the image obtaining unit 1010, and further transferred from the data storage unit 1020 almost in real time. More specifically, according to the present exemplary embodiment, the image processing unit 1050 renders the imaging area CG model at a fixed position in an imaging coordinate system (a camera coordinate system) of the image capturing unit 100 and thus generates the composite image in which the imaging area CG model is superimposed on the actually captured image data of the moving image. Subsequently, the image processing unit 1050 transmits the composite image data in which the imaging area CG model is superimposed on the actually captured image data to the image output unit 1060.

The image output unit 1060 is an example of a display control unit and displays the composite image transmitted from the image processing unit 1050 on a screen of the display unit 200. Accordingly, on the screen of the display unit 200, the composite image is displayed in which the imaging area CG model is superimposed on the actually captured image of the physical space. According to the present exemplary embodiment, the imaging area CG model is rendered at the fixed position in the imaging coordinate system as described above. Therefore, for example, if the actually captured image displayed on the display unit 200 is changed because the user moves his/her head and the imaging direction and the like of the image capturing unit 100 of the HMD 20 is changed, the imaging area CG model is displayed at the fixed position on the screen of the display unit 200, and the display position thereof is not changed.

The imaging area determination unit 1030 determines, with respect to the captured image stored in the data storage unit 1020, whether the hand area is included in an image range equivalent to the imaging area 210. Hereinbelow, an image range equivalent to the imaging area 210 is referred to as an imaging area image. When the hand area is included in the imaging area image, the imaging area determination unit 1030 transmits image data of the hand area to the skin color registration unit 1040.

More specifically, the imaging area determination unit 1030 first reads the captured image data obtained by the image obtaining unit 1010 and stored in the data storage unit 1020. Next, the imaging area determination unit 1030 estimates a distance in a depth direction (depth of pixel) in the physical space with respect to each pixel in the imaging area image of the captured image. The distance in the depth direction of each pixel is a distance, when an imaging plane of the image capturing unit 100 is regarded as an imaging reference plane in the physical space, from the imaging reference plane to a corresponding point on a target object surface corresponding to each pixel of a target object image formed on the imaging plane.

Next, the imaging area determination unit 1030 determines whether the distance in the depth direction (the depth) in the physical space estimated for each pixel is included within a distance range in the depth direction (hereinbelow, referred to as an imaging area distance range) in the three-dimensional space of the imaging area 210 in the physical space. Hereinbelow, the distance range in the depth direction in the three-dimensional space of the imaging area 210 in the physical space is referred to as the imaging area distance range. In addition, when it is determined that the distance in the depth direction (the depth) in the physical space estimated for each pixel is included within the imaging area distance range, the imaging area determination unit 1030 determines that each of these pixels is a pixel of the hand area. Subsequently, the imaging area determination unit 1030 transmits the image data of the hand area including each pixel within the imaging area distance range to the skin color registration unit 1040.

According to the present exemplary embodiment, the distance in the depth direction (the depth) in the physical space of each pixel of the captured image can be obtained using a known method capable of estimating a distance, such as a stereoscopic method using two right and left stereoscopic images of the stereo camera. As other examples of the distance estimation methods, known methods may be used, such as a lens focus method using focusing distance information of a camera lens and a light projection method for projecting specific pattern light on a target object and calculating a distance from a degree of change in the pattern. In addition, for example, a depth sensor may be used which projects infrared light on a target object and measures a distance (depth) based on reflected light thereof. The depth sensor is mounted on, for example, the HMD 20. In FIG. 2, the example is illustrated in which the hand 220 is entirely included in the imaging area 210, however, the above-described distance estimation methods can estimate distances when only a part of the hand 220 is included in the imaging area 210. As described above, the information processing apparatus 1000 according to the present exemplary embodiment estimates the distance in the depth direction (the depth) in the physical space of each pixel in the captured image and thus estimates the distance in the depth direction in the physical space from the imaging reference plane to the hand 220 as the target object.

Figure 3:
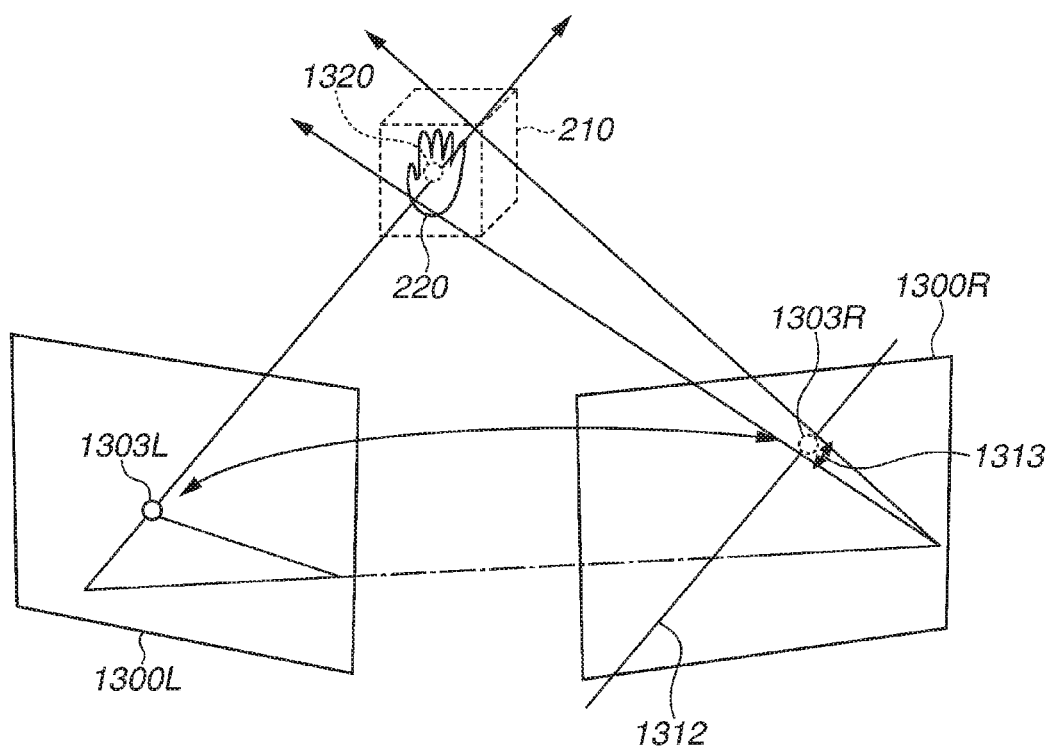
FIG. 3 illustrates determination of a hand area based on feature points of a hand.

Whether the hand area exists in the imaging area image of the captured image or not can be determined without necessarily calculating a value of the distance (the depth) of each pixel. As an example, it may be determined whether the hand area exists in the imaging area image of the captured image based on the known epipolar geometry. In this case, the imaging area determination unit 1030 compares an imaging area image of a left camera image 1300L capturing the hand 220 by the left camera 100L on one side in FIG. 2 and an imaging area image of a right camera image 1300R capturing the hand 220 by the right camera 100R on the other side in FIG. 2 as illustrated in FIG. 3. More specifically, the imaging area determination unit 1030 determines whether a feature point 1303R corresponding to a feature point 1303L in the left camera image 1300L exists in a certain range 1313 on an epipolar line 1312 of the right camera image 1300R. The certain range 1313 corresponds to a size of the imaging area 210 in the physical space. The feature points 1303L and 1303R correspond to a feature point 1320 in the hand 220. Any points, such as an intersection point of edges and a corner point in the image, can be used as long as the point can be handled in object recognition, and a plurality of feature points may be combined. When it is determined that the feature point 1303R corresponding to the feature point 1303L in the left camera image 1300L exists in the certain range 1313 on the epipolar line 1312 of the right camera image 1300R, the imaging area determination unit 1030 determines that the hand area exists in the imaging area image.

According to the determination method of the hand area based on the epipolar geometry, the distance in the depth direction in the physical space from the imaging reference plane to the hand 220 as the target object is also estimated as in the case of the above-described estimation of the distance (the depth) of each pixel. In other words, in the example in FIG. 3, the imaging area 210 is a three-dimensional area virtually set in the physical space, and the distance in the depth direction from the imaging reference plane is virtually set in the physical space. Therefore, when the hand area is detected based on a feature point of the imaging area image corresponding to the imaging area 210, a distance from the imaging reference plane to the hand 220 is estimated to be included within the distance range in the depth direction virtually set to the imaging area 210 in the physical space.

The hand area can also be estimated by creating a known convex hull (a convex envelope) from the captured image. In this case, the imaging area determination unit 1030 first extracts an edge from the captured images of the left and right cameras 100L and 100R using a Sobel filter for detecting a contour (edge) by calculating spatial primary differentiation. Next, the imaging area determination unit 1030 determines whether a point (pixel) on the edge is included within the imaging area image based on the principle of the stereo method using the two left and right stereoscopic images. Subsequently, the imaging area determination unit 1030 creates a convex hull including a pixel set on the edge determined as being included within the imaging area image and estimates an image area of the convex hull as the hand area. A convex hull area may be calculated using any known method, such as a known Quickhull algorithm and Graham's scan algorithm, as long as the convex hull area can be generated.

Returning to the description of FIG. 1, the skin color registration unit 1040 obtains color information of each pixel data determined as the hand area by the imaging area determination unit 1030 and obtains color distribution from the color information of each pixel. The skin color registration unit 1040 stores the color information of each pixel classified into a skin color by the color distribution as skin color information in the data storage unit 1020. Accordingly, the skin color information of the hand 220 of the specific user is registered in the data storage unit 1020. The skin color registration unit 1040 may perform registration in such a manner that the skin color information obtained as described above is added to, for example, a skin color model based on statistical human skin color features prepared in advance.

When generating the above-described composite image in which the imaging area CG model is superimposed thereon, the image processing unit 1050 may generate a composite image by performing predetermined highlighting processing on each pixel of a skin color image portion corresponding to the already registered skin color information. As an example of the predetermined highlighting processing, processing can be cited for compositing a red value by an α value (transmission coefficient) (superimposing by alpha blending) with each pixel of the skin color image portion corresponding to the already registered skin color information. In addition, the predetermined highlighting processing may be processing for blacking out each pixel of the skin color image portion corresponding to the already registered skin color information. Accordingly, the composite image in which an image portion corresponding to the already registered skin color is displayed for a user in an easily understandable manner (highlighted for the user) is displayed on the screen of the display unit 200. As described above, when the skin color image portion corresponding to the already registered skin color is highlighted, the user can recognize that a skin color of the skin color image portion which is not highlighted is an unregistered skin color. The above-described highlighting method is an example, and other display methods may be used as long as the already registered skin color image portion is displayed for a user in an easily understandable manner.

The image processing unit 1050 may generate a composite image expressing an anteroposterior relationship between the imaging area CG model and the hand 220 in the actually captured image in the depth direction in the physical space. As an example, the image processing unit 1050 displays an image portion in the imaging area CG model which is nearer than the hand 220 in the physical space on the actually captured image of the hand 220, in other words, displays the relevant image portion to hide the image of the hand 220. On the other hand, the image processing unit 1050 displays an image portion in the imaging area CG model which is farther than the hand 220 in the physical space under the actually captured image of the hand 220, in other words, displays the relevant image portion to be hidden by the image of the hand 220.

According to the present exemplary embodiment, the imaging area 210 is regarded as the rectangular parallelepiped model as illustrated in FIGS. 2 and 3, however, the imaging area 210 may be any other shape models, for example, a sphere model and the like. When the imaging area 210 is, for example, the sphere model, the imaging area CG model will be a spherical image.

In addition, the imaging area determination unit 1030 may detect the hand area based on the already registered skin color information and estimate a distance of the hand area by the stereo method and the like.

Figure 4:
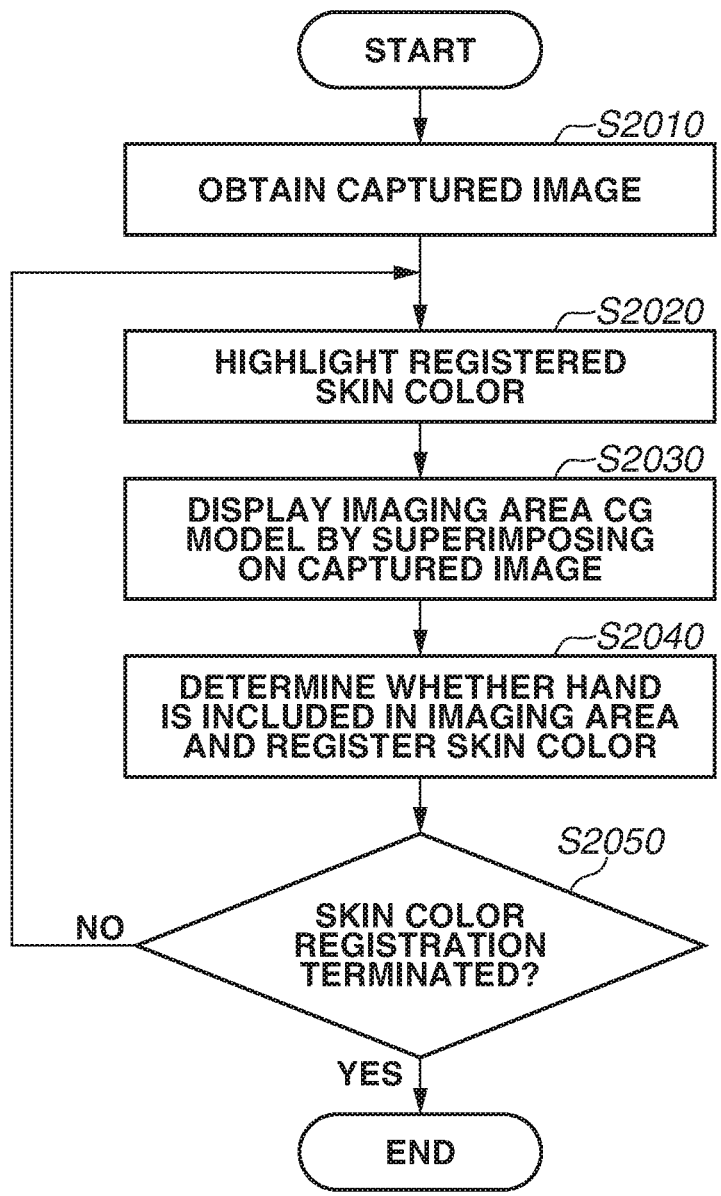
FIG. 4 is a flowchart illustrating processing by the information processing apparatus according to the first exemplary embodiment.

Next, FIG. 4 is a flowchart illustrating a processing flow from obtaining of the captured image to registration of the skin color information in the information processing apparatus 1000 according to the first exemplary embodiment. In FIG. 4, when the processing for obtaining the skin color information from the captured image and registering is started, the information processing apparatus 1000 first advances the processing to step S2010. The processing in step S2010 is performed by the image obtaining unit 1010.

In step S2010, the image obtaining unit 1010 obtains captured image data of each frame in an actually captured image of a moving image captured by the image capturing unit 100 and stores the captured image data in the data storage unit 1020. After step S2010, the processing of the information processing apparatus 1000 proceeds to step S2020 performed by the image processing unit 1050.

In step S2020, the image processing unit 1050 reads the captured image data obtained by the image obtaining unit 1010 and stored in the data storage unit 1020 from the data storage unit 1020. Further, if there is the already registered skin color information, the image processing unit 1050 detects an image portion constituted of each pixel having a color corresponding to the already registered skin color information from the actually captured image. Subsequently, the image processing unit 1050 performs image processing for highlighting each pixel of the image portion corresponding to the already registered skin color information as described above with respect to the actually captured image. After step S2020, the image processing unit 1050 advances the processing to step S2030.

In step S2030, the image processing unit 1050 composites (superimposes) the imaging area CG model to the actually captured image obtained by the image obtaining unit 1010 and transferred from the data storage unit 1020 almost in real time and thus generates the composite image data. Further, the image processing unit 1050 transmits the composite image data to the image output unit 1060. Accordingly, the composite image in which the imaging area CG model is superimposed on the actually captured image is displayed on the screen of the display unit 200. After step S2030, the processing of the information processing apparatus 1000 proceeds to step S2040 performed by the imaging area determination unit 1030 and the skin color registration unit 1040.

In step S2040, the imaging area determination unit 1030 determines whether the image area of the hand 220 (the hand area) is included in the imaging area image in the captured image obtained by the image obtaining unit 1010 and stored in the data storage unit 1020 by the above-described determination processing of the hand area. When it is determined that the hand area is included in the imaging area image, the imaging area determination unit 1030 transmits data of each pixel of the hand area to the skin color registration unit 1040. The skin color registration unit 1040 obtains the color distribution from the color information of each pixel of the hand area transmitted from the imaging area determination unit 1030. Further, the skin color registration unit 1040 registers the color information of each pixel classified into the skin color by the color distribution as the skin color information in the data storage unit 1020. After step S2040, the information processing apparatus 1000 advances the processing to step S2050.

In step S2050, the information processing apparatus 1000 determines whether an instruction to terminate the registration processing of the skin color information is input from a user via, for example, a user interface device, which is not illustrated. When an instruction to terminate the registration processing is not input from a user (NO in step S2050), the information processing apparatus 1000 returns the processing to step S2020. On the other hand, when it is determined that an instruction to terminate the registration processing is input from a user (YES in step S2050), the information processing apparatus 1000 terminates the processing of the flowchart in FIG. 4.

Figure 5:
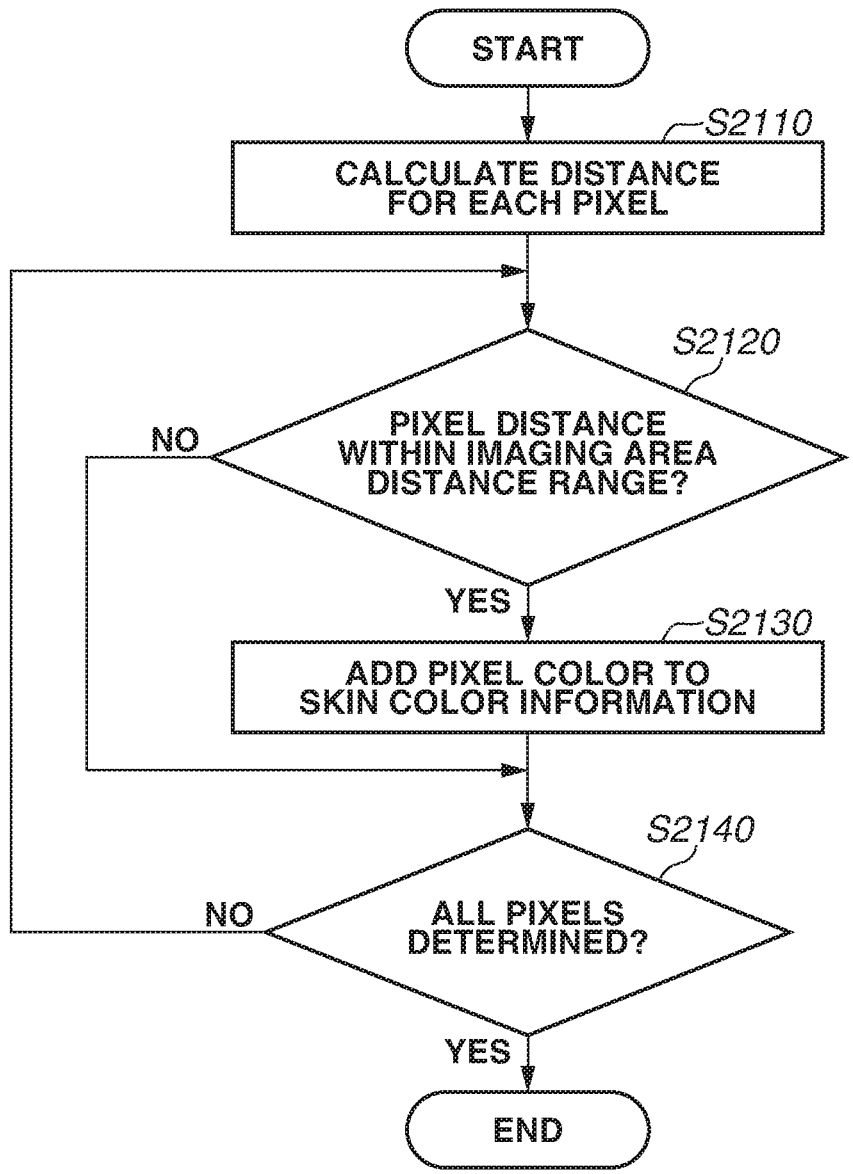
FIG. 5 is a flowchart illustrating hand area determination and skin color registration processing based on a pixel depth.

FIG. 5 is a flowchart illustrating in detail the determination processing of the hand area performed by the imaging area determination unit 1030 and the skin color registration processing performed by the skin color registration unit 1040 in step S2040 in FIG. 4. In FIG. 5, in step S2110, the imaging area determination unit 1030 of the information processing apparatus 1000 calculates a depth (a distance) for each pixel of the captured image using any of the stereo method, the lens focus method, the light projection method, and the depth sensor described above. After step S2110, the imaging area determination unit 1030 advances the processing to step S2120.

In step S2120, the imaging area determination unit 1030 compares the distance of each pixel in the physical space with the imaging area distance range for each pixel of which the distance (depth) is calculated in step S2110. When each pixel exists within the imaging area distance range, the imaging area determination unit 1030 determines that the each pixel is a pixel of the hand area. On the other hand, when the distance of each pixel exists is out of the imaging area distance range, the imaging area determination unit 1030 determines that the pixel is not a pixel of the hand area. In step S2120, regarding the pixel determined as the pixel of the hand area by the imaging area determination unit 1030 (YES in step S2120), the information processing apparatus 1000 advances the processing to step S2130. On the other hand, regarding the pixel determined as not the pixel of the hand area by the imaging area determination unit 1030 (NO in step S2120), the information processing apparatus 1000 advances the processing to step S2140.

The processing in step S2130 is performed by the skin color registration unit 1040. In step S2130, the skin color registration unit 1040 registers the skin color information of the pixel determined as the hand area by the imaging area determination unit 1030 in step S2120 in the data storage unit 1020. After step S2130, the information processing apparatus 1000 advances the processing to step S2140.

In step S2140, the information processing apparatus 1000 determines whether the determination processing described in step S2120 has finished with respect to all pixels of which the distance calculated in step S2110 and the skin color registration processing has finished with respect to all pixels in the hand area in step S2130. When it is determined that all of these processing have not finished (NO in step S2140), the information processing apparatus 1000 returns the processing to step S2120, whereas when it is determined as finished, the information processing apparatus 1000 terminates the processing of the flowchart in FIG. 5.

Figure 6:
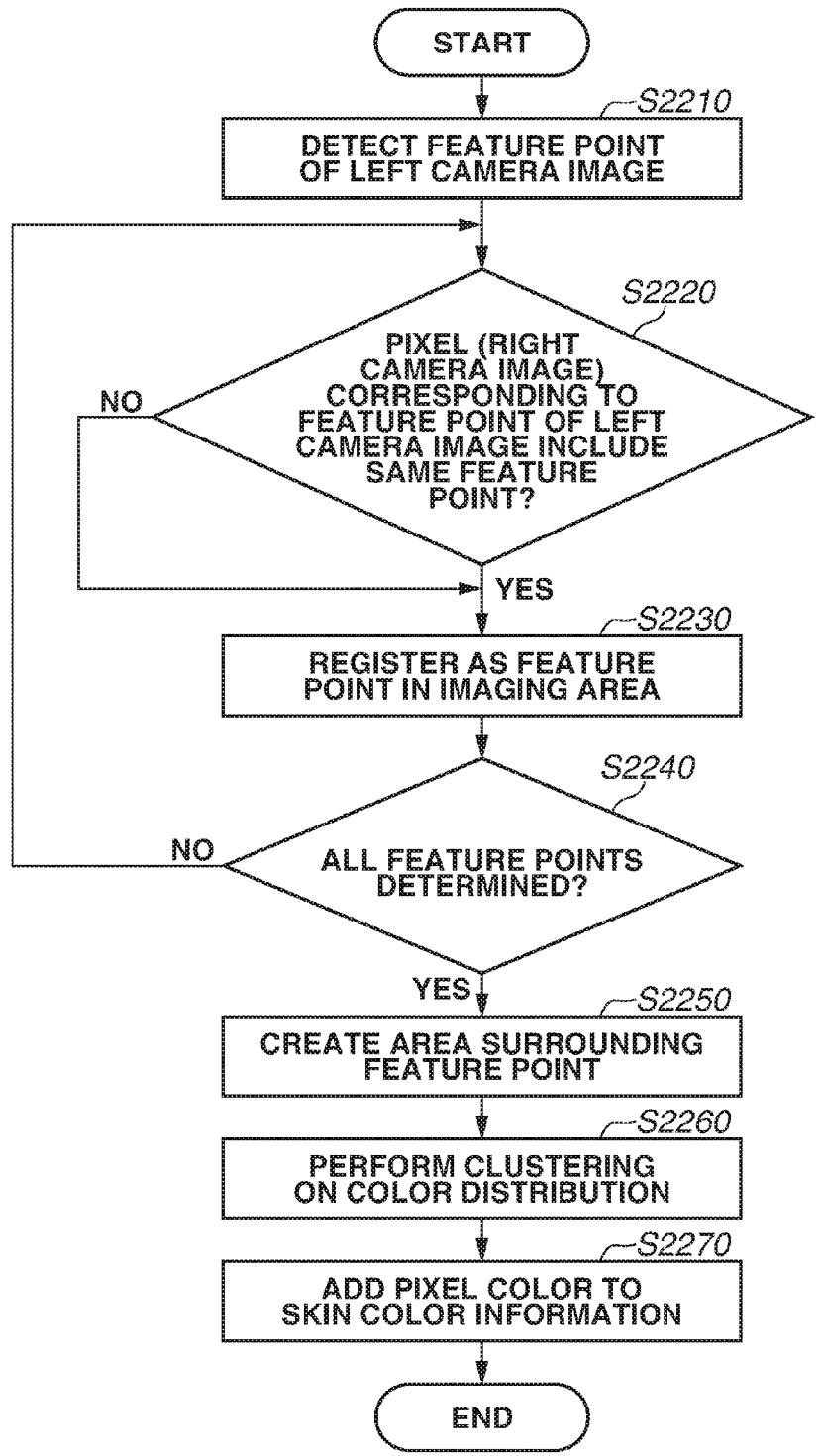
FIG. 6 is a flowchart illustrating hand area determination and skin color registration processing based on feature points of a hand.

Next, FIG. 6 is a flowchart illustrating in detail the hand area estimation processing when the imaging area determination unit 1030 detects the hand 220 (the hand area) based on the epipolar geometry as described above in FIG. 3 and the skin color registration processing performed by the skin color registration unit 1040 in step S2140 in FIG. 4.

In FIG. 6, in step S2210, the imaging area determination unit 1030 reads from the data storage unit 1020 data of the left camera image 1300L in FIG. 3 captured by the left camera 100L. The imaging area determination unit 1030 detects the feature point 1303L from the left camera image 1300L as described above. After step S2210, the imaging area determination unit 1030 advances the processing to step S2220.

In step S2220, the imaging area determination unit 1030 reads from the data storage unit 1020 data of the right camera image 1300R in FIG. 3 captured by the right camera 100R at the same time as that the left camera 100L captured the left camera image 1300L. Next, the imaging area determination unit 1030 determines whether the feature point 1303R corresponding to the feature point 1303L in the left camera image 1300L exists in the right camera image 1300R. In other words, the imaging area determination unit 1030 determines whether a pixel in the right camera image 1300R at coordinates corresponding to a pixel of the feature point 1303L in the left camera image 1300L has the same feature as that of the feature point 1303L. The pixel of the right camera image 1300R corresponding to the pixel of the feature point 1303L in the left camera image 1300L is calculated based on the known epipolar geometry calculation from the depth of the imaging area 210 in FIG. 3 and a relative position and relative orientation of the left and right cameras. When the feature point 1303R corresponding to the feature point 1303L in the left camera image 1300L exists in the right camera image 1300R (YES in step S2220), then in step S2230, the imaging area determination unit 1030 register coordinates of each pixel of the feature points 1303L and 1303R. Registration of the coordinates of the pixels of these feature points is performed by storing the coordinates in the data storage unit 1020. On the other hand, when the feature point 1303R corresponding to the feature point 1303L in the left camera image 1300L does not exist in the right camera image 1300R (NO in step S2220), the imaging area determination unit 1030 does not perform registration in step S2230. After step S2230, the imaging area determination unit 1030 advances the processing to step S2240.

In step S2240, the imaging area determination unit 1030 confirms whether the processing in step S2220 and step S2230 has finished with respect to all feature points detected in step S2210. When the processing has not finished (NO in step S2240), the imaging area determination unit 1030 returns the processing to step S2220, whereas when it is determined as finished (YES in step S2240), the imaging area determination unit 1030 advances the processing to step S2250.

In step S2250, the imaging area determination unit 1030 calculates an image area of the convex hull including the feature point 1320 of the hand 220 in the imaging area image. Subsequently, the imaging area determination unit 1030 transmits image data of the image area of the convex hull as the image data of the hand area to the skin color registration unit 1040. After step S2250, the processing of the information processing apparatus 1000 proceeds to step S2260 performed by the skin color registration unit 1040.

In step S2260, the skin color registration unit 1040 performs clustering by distributing each color data of the hand area in a luminance, chrominance (blue), and chrominance (red) (YCbCr) color space, a hue, saturation, and value (HSV) color space, and the like to remove a noise component from the image data of the hand area transmitted from the imaging area determination unit 1030. After step S2260, the skin color registration unit 1040 advances the processing to step S2270.

In step S2270, the skin color registration unit 1040 registers color information of a cluster including the largest number of the color distribution, namely a cluster classified into the skin color in this case, as the skin color information in the data storage unit 1020. Not only clustering but also histogram may be used for registration of a specific color, such as a skin color. Further, another method may be used as long as the method is for determining the specific color information based on the color distribution in the hand area. After step S2270, when a termination notification is input from a user, the processing of the flowchart in FIG. 6 is terminated.

When registration of the skin color information is performed by the skin color registration unit 1040 as described above, the imaging area determination unit 1030 can determine correct or wrong with respect to the skin color information registered in the skin color registration unit 1040. More specifically, the imaging area determination unit 1030 first tries to detect an image area which can be estimated as the hand area from the left and right camera images 1300L and 1300R based on the skin color information registered in the skin color registration unit 1040. When an image area which can be estimated as the hand area cannot be detected, the imaging area determination unit 1030 determines that the erroneous skin color information is registered in the skin color registration unit 1040. On the other hand, when an image area which can be estimated as the hand area can be detected, the imaging area determination unit 1030 performs stereo matching on a contour line of the image area between the left and right camera images 1300L and 1300R and estimates a three-dimensional position of the contour portion in the physical space. Further, when the three-dimensional position of the contour line corresponds in the imaging area distance range set to the imaging area 210, the imaging area determination unit 1030 determines that the skin color information is correctly registered in the skin color registration unit 1040. On the other hand, when the three-dimensional position of the contour line does not correspond in the imaging area distance range, the imaging area determination unit 1030 determines that the registration of the skin color has failed in the skin color registration unit 1040.

When failure in the registration of the skin color is notified from the imaging area determination unit 1030, the skin color registration unit 1040 discards the skin color registration determined as failure and performs the skin color registration processing again by changing a threshold value of the above-described clustering or histogram. When it is determined that the skin color registration has failed by the imaging area determination unit 1030, the skin color registration determined as failure is discarded, and the hand area determination by the imaging area determination unit 1030 and the skin color registration by the skin color registration unit 1040 may be performed again using a new captured image.

As described above, the information processing apparatus 1000 according to the first exemplary embodiment can register specific color information for enabling accurate detection of the specific color information, such as a skin color, from a captured image without requiring time and effort. In other words, the information processing apparatus 1000 according to the present exemplary embodiment automatically executes estimation of a hand area and extraction and registration of skin color information by a user simply inserting (holding) the hand 220 into the imaging area CG model of the actually captured image displayed on the screen of the HMD 20. Thus, according to the present exemplary embodiment, it is not necessary to prepare an enormous number of the skin color information pieces in advance, and the skin color information suitable for a specific user can be quickly registered without requiring time and effort. As a result, according to the present exemplary embodiment, when the MR is realized, a hand area of a specific user can be accurately extracted from an actually captured image in the physical space, and an image of the user's hand can be composited in the virtual space without causing a feeling of strangeness.

Figure 7:
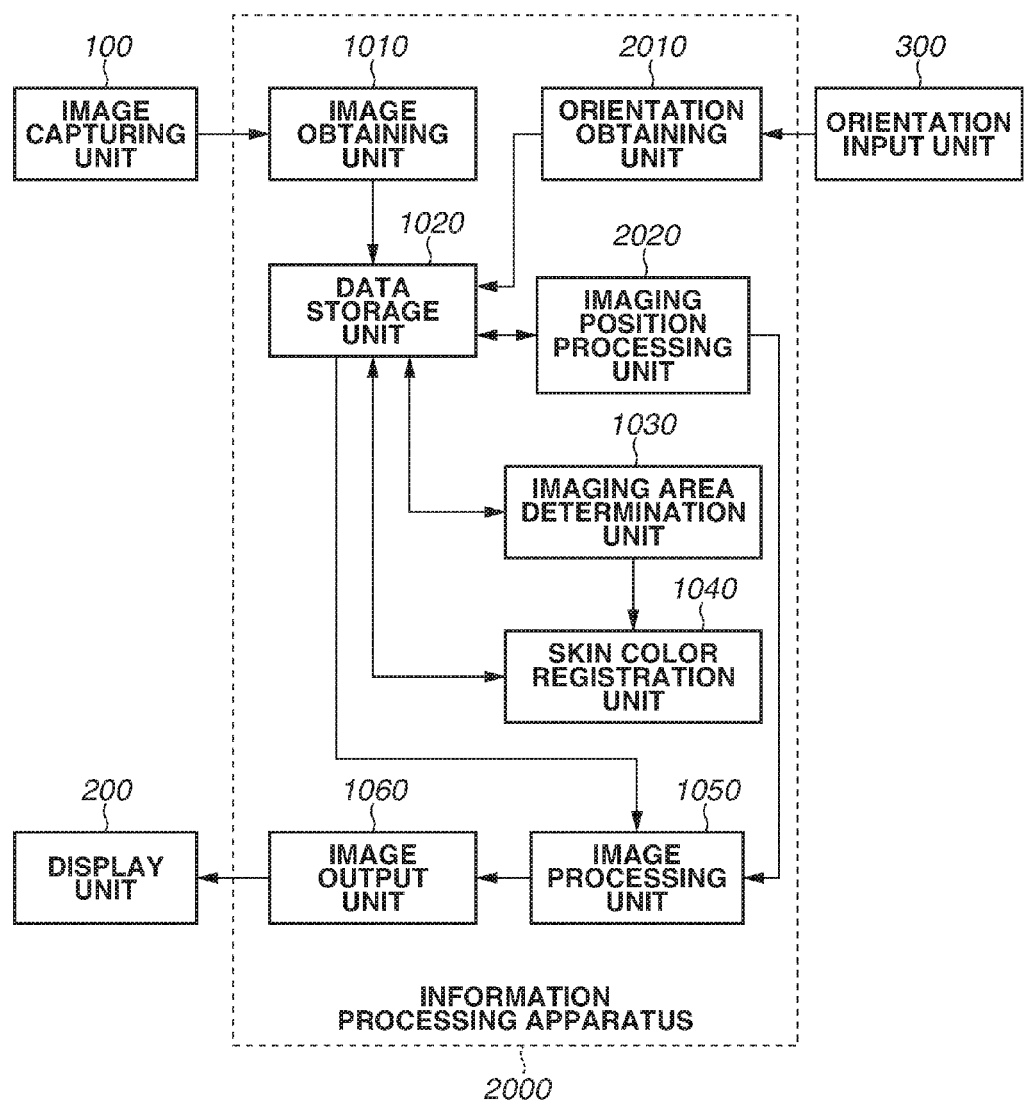
FIG. 7 illustrates an example of a configuration of an information processing apparatus according to a second exemplary embodiment.

FIG. 7 illustrates a schematic configuration of an information processing apparatus 2000 according to a second exemplary embodiment. The information processing apparatus 2000 according to the second exemplary embodiment is connected to the image capturing unit 100, the display unit 200, and an orientation input unit 300. According to the second exemplary embodiment, the image capturing unit 100, the display unit 200, and the orientation input unit 300 are mounted on the HMD. According to the second exemplary embodiment, the information processing apparatus 2000 may be included in the HMD or separated from the HMD as in the case of the above-described first exemplary embodiment.

Figure 8:
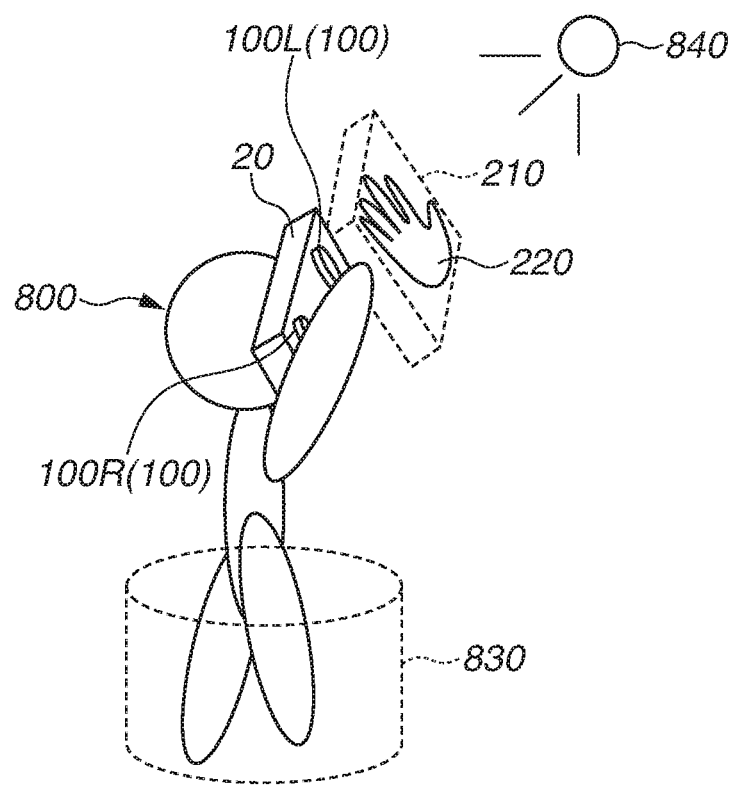
FIG. 8 illustrates an imaging area newly determined according to the second exemplary embodiment.

FIG. 8 schematically illustrates an example of an arrangement relationship between the information processing apparatus 2000 and the HMD 20 according to the second exemplary embodiment. FIG. 8 also schematically illustrates an example of a positional relationship among imaging directions of cameras 100R and 100L (image capturing units 100) of the HMD 20, a hand 220 (a target object) of a user 800, an imaging area 210, a light source 840, and a standing position 830 of the user 800.

In the case that the MR is realized by compositing an actually captured image of a hand and the virtual space, when, for example, an external ambient light and how the light shines on the hand are different, it is possible that a part or whole of the hand cannot be detected from the captured image and/or another object is erroneously detected as the hand. It can be thought that such a state in which a hand cannot be correctly detected occurs because of a change in brightness and a tone of the hand due to difference in the external ambient light and how the light shines on the hand. As examples of the different external ambient light, there are illumination light directly shining on a hand or not, light from a clear sky or a cloudy sky, daylight, sunset light, or morning light, outdoor light or indoor light, light of a bulb or a fluorescent lamp, and so on. Further, as an example of difference in how the light shines on the hand, there is a case when shade is formed on the hand by oblique light. If the hand cannot be correctly detected when the MR is realized, it is possible that, for example, the actually captured image of the hand to be composited in the virtual space cannot be composited, and a video of a part of the hand is only composited.

Therefore, the information processing apparatus 2000 according to the second exemplary embodiment first automatically determines whether a sufficient number of skin color information pieces enough to respond to various external environments has been registered. Subsequently, when it is determined that the already registered skin color information pieces are not sufficient for responding to various external environments, the information processing apparatus 2000 estimates what types of skin color information pieces in brightness and tone are insufficient.

Next, the information processing apparatus 2000 estimates which imaging position a user stands and which direction the user turns the target object (the user's hand) in to perform imaging in order to obtain insufficient skin color information. Further, based on the estimation result, the information processing apparatus 2000 sets a new imaging area 210 to present to the user that which imaging position the user stands and which direction the user turns the target object (the user's hand) in to perform imaging. In other words, the information processing apparatus 2000 determines a three-dimensional position in the physical space at which the new imaging area 210 is disposed. The information processing apparatus 2000 composites an imaging area CG model representing the new imaging area 210 to the actually captured image so that the imaging area CG model is disposed on a display position corresponding to the three-dimensional position in the physical space and display the composite image on the display unit 200 of the HMD 20. Subsequently, the information processing apparatus 2000 determines whether a sufficient number of skin color information pieces enough to respond to various external environments is registered, and when it is determined that the sufficient number of skin color information pieces is registered, the information processing apparatus 2000 automatically terminates the skin color registration processing.

The example in FIG. 8 illustrates a positional relationship when the insufficient skin color information is, for example, the skin color information of the hand under a backlight environment. In order to obtain the skin color information of the hand 220 under the backlight environment, the information processing apparatus 2000 sets the imaging area 210 for presenting the standing position 830 of the user 800, a direction in which the hand 220 to be turned, and a distance (the depth) at the time of imaging. In the example in FIG. 8, the information processing apparatus 2000 displays, on the display unit 200 of the HMD 20, the imaging area CG model representing the imaging area 210 for causing the user to turn the image capturing unit 100 of the HMD 20 to a direction of the light source 840 and place the hand 220 between the image capturing unit 100 and the light source 840.

The information processing apparatus 2000 according to the second exemplary embodiment includes each component illustrated in FIG. 7 for setting the imaging area 210 as the example in FIG. 8. In FIG. 7, the same components as those in the above-described in FIG. 1 are denoted by the same reference numerals, and descriptions thereof are omitted. The information processing apparatus 2000 according to the second exemplary embodiment illustrated in FIG. 7 includes an orientation obtaining unit 2010 and an imaging position processing unit 2020 in addition to each components illustrated in the above-described in FIG. 1. According to the second exemplary embodiment, the information processing apparatus 2000 also includes the orientation input unit 300 which is mounted on, for example, the HMD.

The orientation input unit 300 detects an imaging direction (bearing) and an imaging orientation of the camera, namely the image capturing unit 100 (the cameras 100R and 100L in FIG. 8) at the time of imaging. More specifically, the orientation input unit 300 is a gyro sensor, an optical sensor, a bearing sensor, and the like built in the HMD 20 and generates imaging bearing information about the cameras 100R and 100L of the HMD 20 and camera orientation information including a yaw, a pitch, and a roll. The imaging bearing information and the camera orientation information detected by the orientation input unit 300 are transmitted to the orientation obtaining unit 2010.

When image data is obtained by the image obtaining unit 1010, the orientation obtaining unit 2010 obtains from the orientation input unit 300 the imaging bearing information and the camera orientation information including the yaw, the pitch, and the roll, and stores these information pieces in the data storage unit 1020. Further, the orientation obtaining unit 2010 stores date and time information at the time of imaging by the image capturing unit 100 in the data storage unit 1020.

The imaging area determination unit 1030 according to the second exemplary embodiment detects the hand area in a way similar to that of the above-described first exemplary embodiment. The skin color registration unit 1040 according to the second exemplary embodiment obtains color distribution of each pixel from each pixel data of the hand area in a way similar to that of the above-described first exemplary embodiment. Further, according to the second exemplary embodiment, the skin color registration unit 1040 calculates luminance of each pixel from each pixel data of the hand area. The skin color registration unit 1040 stores the skin color information of each pixel classified into the skin color by the color distribution and luminance information of each pixel as the skin color information in the data storage unit 1020.

The imaging position processing unit 2020 is an example of a setting unit and registers, for example, the imaging bearing information, the camera orientation information, and the skin color information stored in the data storage unit 1020 by associating with each other based on the date and time information when imaging is performed by the image capturing unit 100. In other words, the imaging position processing unit 2020 associates the imaging bearing information and the camera orientation information when imaging is performed by the image capturing unit 100 with the skin color information obtained from the captured image when the imaging bearing information and the camera orientation information are obtained and registers these information pieces. Further, the imaging position processing unit 2020 determines a display position of the imaging area CG model which is composited to the actually captured image by the image processing unit 1050 and displayed on the screen of the display unit 200 with reference to the imaging bearing information, the camera orientation information, a color of the skin color information, and the luminance information.

More specifically, the imaging position processing unit 2020 first confirms whether luminance of the skin color registered in the past is uniformly distributed. Taking a case in which luminance is expressed by values from 0 to 255 as an example, a case when luminance of the skin color registered in the past is uniformly distributed represents a state in which values from 0 to 255 are registered as luminance values. As described above, when the luminance of the skin color registered is uniformly distributed, it can be thought that a sufficient number of the skin color information pieces enough to respond to various external environments has been registered. On the other hand, when the luminance of the skin color registered in the past is not uniformly distributed, and the luminance has deviation in distribution, it can be thought that a sufficient number of the skin color information pieces enough to respond to various external environments has not been registered. Therefore, when the luminance of the skin color registered in the past is not uniformly distributed, the imaging position processing unit 2020 estimates a new imaging area 210 necessary for uniformly distributing the luminance distribution with reference to the imaging bearing information, the orientation of the camera, and the luminance of the skin color information stored in the past. In other words, the imaging position processing unit 2020 estimates the imaging area 210 for supplementing luminance distribution insufficient for the uniform luminance distribution.

When the new imaging area 210 is set to uniformly distribute the luminance distribution, the imaging position processing unit 2020 first refers to the luminance distribution of each camera orientation toward each imaging bearing at the time of imaging in the past. The imaging position processing unit 2020 calculates a luminance gradient expressing how the luminance distribution is changed by a change of the camera orientation in each imaging bearing. Further, the imaging position processing unit 2020 estimates the imaging bearing and the camera orientation for capturing an image of an insufficient skin color based on the luminance gradient in the past imaging and sets the new imaging area 210 based on the estimation result.

By describing with reference to the above-described FIG. 8, when imaging has been performed in various imaging bearings and camera orientations under a follow light environment in the past, and the skin color information has been registered by being associated with each camera orientation in each imaging bearing, it can be thought that the luminance distribution is distributed nearer high luminance corresponding to the follow light environment. In this case, it is necessary to obtain a low luminance skin color to uniformly distribute the luminance distribution. In addition, from the luminance gradient calculated from the luminance distribution based on such past imaging, it can be estimated that how the standing position 830 of the user and the imaging bearing are set and what position the hand 220 is placed in the physical space to capture an image of a low luminance skin color. In other words, in the case of the example in FIG. 8, it can be estimated that an image of a low luminance skin color can be captured when imaging is performed under the backlight environment in such a manner that the imaging bearing is directed toward the light source 840 at the standing position 830 of the user 800, and the hand 220 is placed between the light source 840 and the image capturing unit 100. Therefore, the imaging position processing unit 2020 determines the imaging area 210 for guiding a motion of the user 800 so that the image capturing unit 100 of the HMD 20 takes the imaging bearing directed toward the light source 840 at the standing position 830, and the hand 220 is placed between the light source 840 and the image capturing unit 100.

According to the second exemplary embodiment, it is necessary to guide a motion of the user 800 by the imaging area 210, so that the imaging position processing unit 2020 changes the display position of the imaging area CG model on the screen of the display unit 200 of the HMD 20 unlike the fixed position according to the first exemplary embodiment. More specifically, when the user 800 stands on the standing position 830 in FIG. 8, the imaging position processing unit 2020 changes the display position of the imaging area CG model moment to moment on the screen of the display unit 200 until the hand 220 enters the imaging area 210 in FIG. 8. Accordingly, the user 800 is guided to turn the image capturing unit 100 toward the light source 840 and to move the hand 220 to enter between the light source 840 and the image capturing unit 100.

Figure 9:
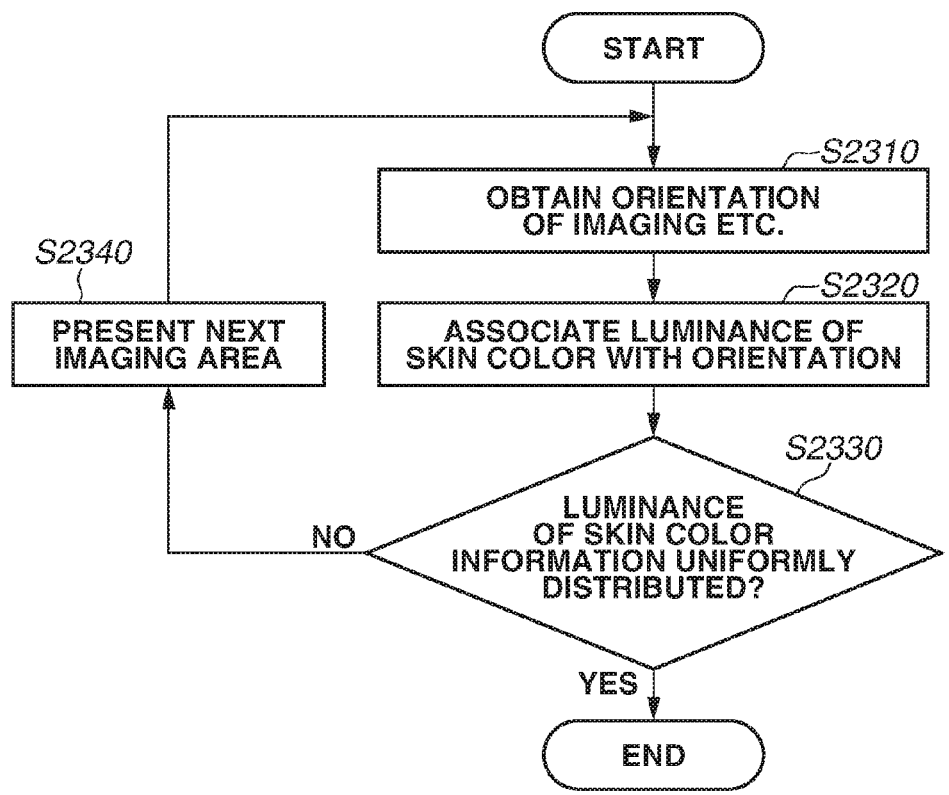
FIG. 9 is a flowchart illustrating processing of an imaging position processing unit in the information processing apparatus according to the second exemplary embodiment.

FIG. 9 is a flowchart illustrating a process flow in the imaging position processing unit 2020 of the information processing apparatus 2000 according to the second exemplary embodiment. In FIG. 9, as the processing in step S2310, the imaging position processing unit 2020 reads the imaging bearing information and the camera orientation information detected by the orientation input unit 300 and obtained by the orientation obtaining unit 2010 from the data storage unit 1020. After step S2310, the imaging position processing unit 2020 advances the processing to step S2320.

In step S2320, the imaging position processing unit 2020 reads the skin color information when the imaging bearing information and the camera orientation information are obtained from the data storage unit 1020 and registers the imaging bearing information, the camera orientation information, and the skin color information by associating with each other in the data storage unit 1020. After step S2320, the imaging position processing unit 2020 advances the processing to step S2330.

In step S2330, the imaging position processing unit 2020 determines whether luminance of the skin color registered in the data storage unit 1020 in the past is uniformly distributed. In step S2330, when it is determined that the luminance of the skin color registered in the past is uniformly distributed (YES in step S2330), the imaging position processing unit 2020 determines that a sufficient number of the skin color information pieces enough to respond to various external environments has been registered and terminates the processing in FIG. 9. On the other hand, in step S2330, when it is determined that the luminance of the skin color registered in the past is not uniformly distributed (NO in step S2330), the imaging position processing unit 2020 advances the processing to step S2340.

In step S2340, the imaging position processing unit 2020 estimates the new imaging area 210 so as to be able to obtain the uniform luminance distribution from changes in the camera orientation and the luminance distribution registered in the past by supplementing luminance of insufficient skin color information. Subsequently, the imaging position processing unit 2020 causes the image processing unit 1050 to generate the new imaging area 210 and presents the imaging area 210 to the user 800 by displaying the imaging area CG model representing the imaging area 210 on the screen of the display unit 200. After step S2340, the imaging position processing unit 2020 returns the processing to step S2310 and repeats the processing from step S2310 to step S2340 until it is determined that the uniform luminance distribution is obtained in step S2330.

As described above, the information processing apparatus 2000 according to the second exemplary embodiment can register specific color information such as a skin color from a captured image without requiring time and effort as in the case of first exemplary embodiment. The information processing apparatus 2000 according to the second exemplary embodiment automatically determines whether a sufficient number of skin color information pieces enough to respond to various external environments is registered. In addition, when the already registered skin color information is insufficient, the information processing apparatus 2000 according to the second exemplary embodiment presents the new imaging area 210 to a user, so that a sufficient number of skin color information pieces enough to respond to various external environments can be obtained and registered. Further, the information processing apparatus 2000 according to the second exemplary embodiment can automatically terminate the skin color registration processing when determining that a sufficient number of skin color information pieces enough to respond to various external environments can be registered.

According to the present invention, color information for enabling accurate detection of a specific color such as a skin color can be registered without requiring time and effort.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-105599, filed May 25, 2015, which is hereby incorporated by reference herein in its entirety.

What is claimed is:

1. An information processing apparatus comprising:
a memory configured to store a program; and
a processor configured to execute the program stored in the memory to function as:
a generation unit configured to generate a synthesized image to be displayed by synthesizing an image representing a target area in which a target object is arranged with a captured image of a physical space;
a detection unit configured to estimate a distance from the imaging reference plane for each pixel in the target area, determine whether the distance estimated for each pixel is included within the distance range, in a case where it is determined that the estimated distance is included within the distance range, determines that the target object is included within the distance range, and detect an area including each pixel determined as being one for which the estimated distance is included within the distance range as the area of the target object in the target area; and
a registration unit configured to determine whether the target object in the target area in the synthesized image is included in a distance range set as a distance from an imaging reference plane when the physical space is captured, in a case where it is determined that the target object is included in the distance range, to extract color information from the target area, and to register the extracted color information as specific color information.

2. The information processing apparatus according to claim 1, wherein
the target area is a three-dimensional area virtually set in the physical space, and
the detection unit determines whether the target object is included in the distance range that the three-dimensional area in the target area virtually includes in the physical space as a distance range in a depth direction from the imaging reference plane.

3. The information processing apparatus according to claim 1, wherein the registration unit obtains color distribution from color information extracted from the target area, classifies the color distribution, and registers color information of color distribution classified into the specific color information as the specific color information.

4. The information processing apparatus according to claim 1, wherein the generation unit generates the synthesized image to be displayed by arranging the image representing the target area so as to correspond to a fixed position in an imaging coordinate system when a synthesized image of the physical space is captured and synthesizing the image representing the target area with the captured image.

5. The information processing apparatus according to claim 1, further comprising:
an orientation obtaining unit configured to obtain information of an imaging direction and an imaging orientation when the captured image is captured; and
a setting unit configured to register the information of the imaging direction and the imaging orientation obtained by the orientation obtaining unit when the captured image is captured by associating the information with color information extracted from the target area and registered by the registration unit, and set a three-dimensional position for virtually arranging the target area in the physical space based on the registered color information, imaging direction, and imaging orientation,
wherein the generation unit generates the synthesized image to be displayed by arranging the image representing the target area on a display position in a captured image corresponding to the set three-dimensional position and synthesizing the image representing the target area with the captured image.

6. The information processing apparatus according to claim 5, wherein the setting unit obtains insufficient luminance with respect to a uniform luminance distribution from luminance distribution included in the color information registered by the registration unit, estimates an imaging direction and an imaging orientation for imaging to supplement the insufficient luminance with respect to the uniform luminance distribution with reference to the registered color information, imaging direction, and imaging orientation, and sets the three-dimensional position for virtually arranging the target area in the physical space based on the estimated imaging direction and imaging orientation.

7. The information processing apparatus according to claim 1, wherein the generation unit performs predetermined highlighting processing on a pixel including the registered color information in each pixel included in the captured image of the physical space, and generates the synthesized image using the captured image after subjected to the predetermined highlighting processing on the pixel.

8. The information processing apparatus according to claim 1, wherein, in a case where the target object captured in the captured image of the physical space is overlapped with the target area,
the generation unit
generates the synthesized image by superimposing an image of the target object in the captured image of the physical space on the target area in a case where the distance range is nearer to the imaging reference plane than the distance of the image of which the distance is estimated by the detection unit for each pixel, and
generates the synthesized image by superimposing an image of the target object in the captured image of the physical space under the target area in a case where the distance range is farther from the imaging reference plane than the distance of the image of which the distance is estimated by the detection unit for each pixel.

9. The information processing apparatus according to claim 1, wherein the captured image obtained by capturing the physical space is two right and left stereoscopic images imaging the physical space, and
the detection unit obtains a first feature point in the target area of one image in the two right and left stereoscopic images, determines whether a second feature point corresponding to the first feature point exists on an epipolar line corresponding to the target area of another image of the two right and left stereoscopic images, and, in a case where it is determined that the second feature point corresponding to the first feature point exists on the epipolar line, determines that the target object is included within the distance range.

10. The information processing apparatus according to claim 9, wherein the detection unit determines whether a plurality of second feature points respectively corresponding to a plurality of first feature points obtained from the target area of the one image exist on the epipolar line corresponding to the image range of the another image and, in a case where it is determined that the plurality of second feature points respectively corresponding to the plurality of first feature points exist on the epipolar line, detects the target area including each of the plurality of first feature points of the one image and an image area including each of the plurality of second feature points of the another image as the target area of the target object.

11. The information processing apparatus according to claim 3, wherein the detection unit determines whether registration of the color information is erroneous or not, and
in a case where the detection unit determines that registration of the color information is erroneous, the registration unit discards the registration of the color information determined as erroneous and performs extraction of the color information and registration of the extracted color information again.

12. The information processing apparatus according to claim 11, wherein, in a case where the detection unit determines that the registration of the color information is erroneous, the registration unit again registers color information extracted again by changing a threshold value used when the color information is extracted or color information newly extracted from a target area detected by the detection unit using a new captured image as specific color information.

13. The information processing apparatus according to claim 1, further comprising:
an imaging control unit configured to cause an image capturing unit to capture a three-dimensional captured image of the physical space; and
a display control unit configured to cause a display unit to three-dimensionally display the synthesized image.

14. A method for processing information, the method comprising:
generating a synthesized image to be displayed by synthesizing an image representing a target area in which a target object is arranged with a captured image of a physical space;
estimating a distance from the imaging reference plane for each pixel in the target area, determining whether the distance estimated for each pixel is included within the distance range, in a case where it is determined that the estimated distance is included within the distance range, determining that the target object is included within the distance range, and detecting an area including each pixel determined as being one for which the estimated distance is included within the distance range as the area of the target object in the target area; and
determining whether the target object in the target area in the synthesized image is included in a distance range set as a distance from an imaging reference plane when the physical space is captured, in a case where it is determined that the target object is included in the distance range, extracting color information from the target area, and registering the extracted color information as specific color information.

15. A non-transitory computer-readable storage medium storing a program causing a computer to function as each unit of an information processing apparatus comprising:
a generation unit configured to generate a synthesized image to be displayed by synthesizing an image representing a target area in which a target object is arranged with a captured image of a physical space;
a detection unit configured to estimate a distance from the imaging reference plane for each pixel in the target area, determine whether the distance estimated for each pixel is included within the distance range, in a case where it is determined that the estimated distance is included within the distance range, determines that the target object is included within the distance range, and detect an area including each pixel determined as being one for which the estimated distance is included within the distance range as the area of the target object in the target area; and a registration unit configured to determine whether the target object in the target area in the synthesized image is included in a distance range set as a distance from an imaging reference plane when the physical space is captured, in a case where it is determined that the target object is included in the distance range, to extract color information from the target area, and to register the extracted color information as specific color information.

* * * * *